(12) United States Patent
Kajiyama

(10) Patent No.: US 6,755,571 B2
(45) Date of Patent: Jun. 29, 2004

(54) ROTATIONAL AND BEARING STRUCTURES AND A SEAT-WEIGHT MEASURING APPARATUS

(75) Inventor: Hiroshi Kajiyama, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/050,939

(22) Filed: Jan. 22, 2002

(65) Prior Publication Data

US 2002/0125049 A1 Sep. 12, 2002

(30) Foreign Application Priority Data

Jan. 19, 2001 (JP) ........................................ 2001-011865
Dec. 13, 2001 (JP) ........................................ 2001-379905

(51) Int. Cl.[7] .............................................. F16C 33/02
(52) U.S. Cl. .................................................... 384/276
(58) Field of Search ................................ 384/276, 295, 384/428, 215, 192; 177/144

(56) References Cited

U.S. PATENT DOCUMENTS 1,384,173 A * 7/1921 Wikander .................... 384/280
3,829,184 A * 8/1974 Chevret ....................... 384/280
4,390,208 A * 6/1983 Widmer et al. ......... 397/378.11
5,251,986 A * 10/1993 Arena ......................... 384/272

FOREIGN PATENT DOCUMENTS

JP 2000-258233 9/2000

* cited by examiner

Primary Examiner—Jack Lavinder
Assistant Examiner—Xuan Lan Nguyen
(74) Attorney, Agent, or Firm—Foley & Lardner

(57) ABSTRACT

A rotational structure and a bearing structure is provided wherein discomfort of people therearound is eliminated by suppressing noise due to movement (rattle) of a member in a rotational supporting point within small clearance. In a bearing structure for a seat-weight measuring apparatus, etc., sleeve members are inserted into insertion holes of an arm member and a bracket or bearing member while a pivot pin and a stopper pin or shaft member are inserted into insertion holes of sleeve members. The sleeve members are formed so that any of part of the insertion holes of the sleeve members always comes into contact with the pivot pin or the stopper pin so as not to allow the pivot pin or the stopper pin to run freely within the insertion holes of the sleeve members when the pivot pin or the stopper pin moves.

9 Claims, 15 Drawing Sheets

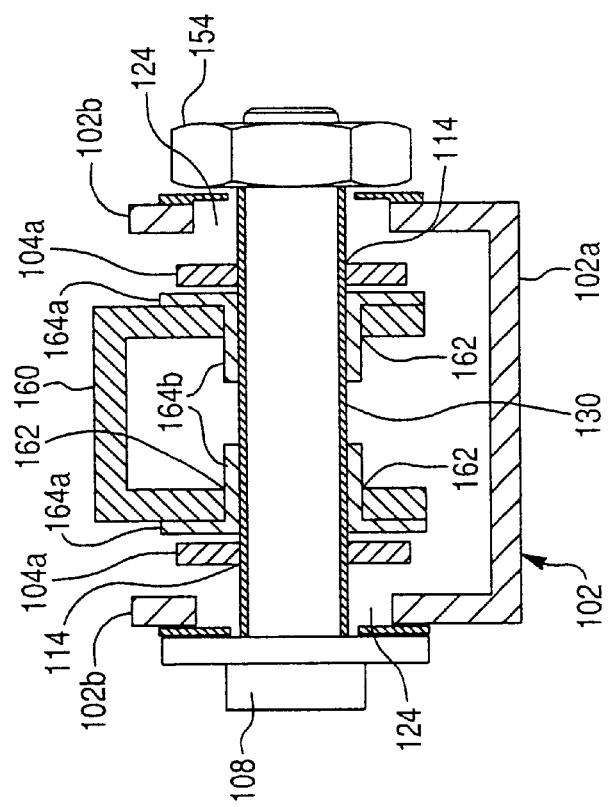
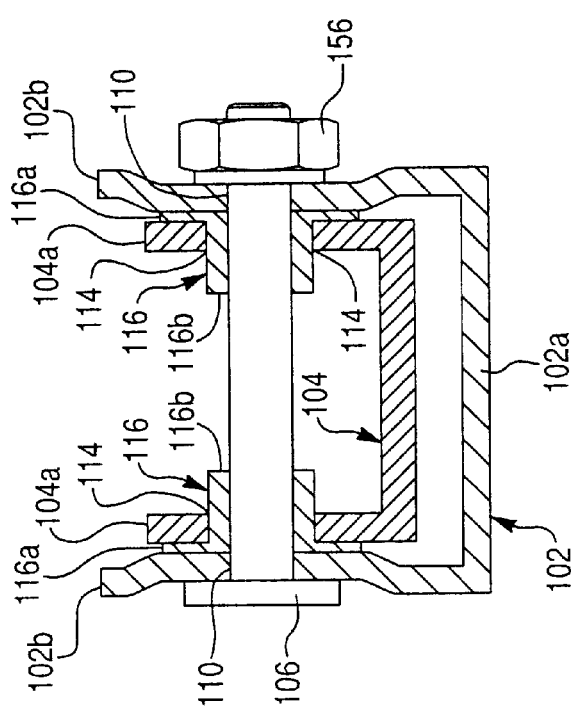

ROTATIONAL AND BEARING STRUCTURES AND A SEAT-WEIGHT MEASURING APPARATUS

BACKGROUND OF THE INVENTION

The present invention relates to bearing structures for use in a rotational structure of a mechanical structure and in an automobile cabin and further relates to a seat weight measuring apparatus having the bearing structures. In particular, it relates to a rotational structure and a bearing structure wherein discomfort of people therearound is eliminated by suppressing noise due to movement (rattle) of a member in a rotational supporting point within small clearance.

In an automobile cabin, various bearing structures are used, in which shaft members are inserted into bearing members. In these bearing structures, rattling of the shaft member may occur due to errors in size of the shaft member, the bearing member, and a sleeve member, or errors in size of a vehicle cabin and a seat. Although noise due to the chattering is very low, comfortableness in the automobile cabin may be reduced. Therefore, means for suppressing the rattle of the bearing structures is required.

The prior art will be described in detail below with reference to the bearing structure in the automobile cabin as an example, in which a seat belt and an airbag are equipped.

With regard to the current trend, in order to improve the performance of the seat belt and the airbag, operation of such safety equipment may be controlled in accordance with the weight of an occupant. For example, the gas quantity or gas rate for deploying the airbag may be adjusted, or the pre-tension of the seat belt may be adjusted according to the weight of an occupant. That requires detecting the weight of an occupant. As an example of such means, it is proposed to measure the seat-weight including the weight of an occupant by arranging load sensors (load cells) at four corners, back-and-forth and the right and left, under the seat so as to sum the loads applied to the load cells in the vertical direction.

An example of such a seat-weight measuring apparatus is disclosed in Japanese Unexamined Patent Application Publication No. 2000-258233 (incorporated by reference herein in its entirety). The seat-weight measuring apparatus in the Publication simply measures not only the weight of an occupant and a seat but also has a mechanism for absorbing displacement and/or deflection between the seat and a vehicle body for eliminating the load other than from the weight of the seat and an occupant (or goods) thereon as much as possible. In the seat-weight measuring apparatus having such a deflection absorbing mechanism, bearing structures are also used, so that means for suppressing rattle of bearing parts is also required.

Referring to FIGS. 9 to 12, the seat-weight measuring apparatus disclosed in Japanese Unexamined Patent Application Publication No. 2000-258233 will be further described below. First, structures around an vehicle seat will be described with reference to FIG. 12.

FIG. 12(A) is a front sectional view for schematically showing a structure of the seat attached to the vehicle body; and FIG. 12(B) is a side view thereof. In addition, arrows shown in the drawings indicate the following directions. UP: upward gravitational direction when the vehicle body is horizontal, DOWN: downward direction, FRONT: vehicle proceeding direction, REAR: reverse travel direction, LEFT: the left side facing in the vehicle proceeding direction, and RIGHT: the right side.

In FIGS. 12(a) and 12(b), a seat 3 is shown. An occupant 1 sits on a seat cushion 3a. The bottom surface of the seat cushion 3a is supported by a seat frame 5 made of a steel plate. The seat frame 5 comprises a bottom plate 5a, side plates 5c, vertical plates 5e, and slide plates 5g. The bottom plate 5a spreads out so as to cover the bottom surface of the seat cushion 3a. The side plates 5c extend along the respective right and left sides of the bottom surface of the bottom plate 5a. The vertical plate 5e hangs down from the bottom surface center of the side plate 5c. The slide plate 5g protrudes to the right and left from the vertical plate 5e as blades, and end portions thereof are further bent upwardly.

Two seat rails 7 are arranged in parallel under the seat 3 in the right and left sides, extending in the back-and-forth direction. The cross-section of the seat rail 7 is U-shaped, a concave portion 7c exists inside thereof. The upper opening of the concave portion 7c is a groove 7a extending in the back-and-forth direction. Into the groove 7a, the vertical plate 5e of the seat frame 5 is inserted. Into the concave portion 7c of the seat rail 7, the slide plate 5g of the seat frame 5 is entered. The slide plate 5g is slidable within the seat rail 7 in the back-and-forth direction. To the bottom surface of the seat rail 7, the seat-weight measuring apparatus 9 is connected. The seat-weight measuring apparatus 9 has an elongated box-like shape extending in the back-and-forth direction. Details of the seat-weight measuring apparatus 9 will be described later. At the front and rear ends of the bottom surface of the seat-weight measuring apparatus 9, seat brackets 11 are attached. The seat bracket 11 is fixed to a seat fixing portion 13 of the vehicle body with bolts, etc.

Next, the structure of the seat-weight measuring apparatus is described.

FIG. 9(A) is a disassembled perspective view of the displacement and/or deflection absorbing mechanism of the seat-weight measuring apparatus 9; FIG. 9(B) is a front sectional view of a pin bracket.

FIG. 10(A) is a plan view of the entire structure of the seat-weight measuring apparatus; FIG. 10(B) is a side sectional view; FIGS. 10(C) and (D) are front sectional views. In addition, in FIGS. 10(A) and (B), substantially half of the rear part is not shown.

FIG. 11(A) is a plan view showing the relationship between a sensor plate and a half arm; FIG. 11(B) is a side view in a no-load state; FIG. 11(C) is a side view schematically showing a state in that a load is applied.

The seat-weight measuring apparatus 9 is constructed based on an elongated rail-like base (base frame) 21. The base 21 extends in the back-and-forth direction when attached to the vehicle body and is a steel-plate pressed product having an upward U-shape front-section as shown in FIGS. 10(C) and (D). The sectional bottom portion of the base 21 is called a bottom plate 21c; portions elevated at right angles from lateral ends of the bottom plate 21c are called side plates 21a.

In the base side plate 21a, pin holes 21e and 21g are formed two each on the front and rear portions. The respective holes 21e and 21g are formed on the right and left side plates 21a and 21a' opposing each other.

The holes 21e, which are closer to the end, are formed at positions approaching the center by approximately ⅛ of the entire length of the base 21 from the front and rear ends. The hole 21e is a hole much elongated in the vertical direction, as shown in FIG. 9(A). Within the elongated holes 21e, end portions of a bracket pin (stopper pin) 27 are entered.

However, there are clearances between the bracket pin 27 and top/bottom and right/left ends of the elongated hole 21e, so that the bracket pin 27 does not normally come into contact with internal edges of the elongated hole 21e. When an excessive load is applied to the seat-weight measuring apparatus 9 (specifically, part of a pin bracket 25), however, the bracket pin 27 is lowered and abuts the bottom end of the elongated hole 21e, so that the excessive load cannot be transmitted to a load sensor (a sensor plate 51, details will be described). That is, the pin 27 and the elongated hole 21e form part of a mechanism for restricting the upper limit load applied to the sensor plate 51. In addition, the principal function of the bracket pin 27 is to transmit the seat weight applied to the pin bracket 25 to a Z-arm (arm member) 23.

At positions slightly closer to the center from the elongated holes 21e (approaching the center by approximately ⅒ of the entire length of the base 21), the pin holes 21g are formed. Into the pin holes 21g, a base pin (pivot pin) 31 is inserted. The base pin 31 exists so as to bridge between the right and left base side plates 21a and 21a'. At lateral ends of the pin 31, retainers 33 are attached, so that the base pin 31 is fixed to the base 21. In addition, the base pin 31 is a rotational central axis of the Z-arm 23.

The Z-arm 23 is arranged inside the base 21. The Z-arm 23 has a shape in plan view, in which one end closer to the center of the base 21 is forked into two parts (forked parts 23h) while the other end closer to the front or rear end is rectangular. The lateral ends of the half part closer to the front or rear end are elevated at right angles to form side plates 23a. The forked part 23h is a simple flat plate. The side plate 23a is arranged along the inside of the side plate 21a in the base 21; however, there is a clearance between the side plates 21a and 23a.

The Z-arm 23 also has two pin holes 23c and 23e formed thereon. Into the pin hole 23c closer to the front or rear end, the bracket pin 27 is inserted. Into the pin hole 23e closer to the center, the base pin 31 is inserted. At the external periphery of the base pin 31 between the base side plate 21a and the Z-arm side plate 23a, a perforated circular disk-like spacer 35 is fitted. The Z-arm 23 is rotated about the base pin 31.

The forked part 23h of the Z-arm 23 has a length approximately half of the entire length of the Z-arm 23. The forked parts 23h are laterally divided and extend toward the center in the front and rear direction, and are reduced in width at portions closer to the center. Application parts 23j at ends of the Z-arm forked parts 23h are sandwiched between blades 41a and 42a of the upper and lower half arms 41 and 42.

When a load is applied to the pin bracket 25, the load is transmitted to the Z-arm 23 via the bracket pin 27 so as to rotate the Z-arm 23 slightly (approximately 5° at most), which in turn is transmitted by the application parts 23j to the sensor plate 51 of the load sensor 50 via the half arms 41 and 42.

The pin bracket 25, as shown in FIG. 10(C), has a downward substantially U-shaped cross section. The length thereof in the front and rear direction is not so long, that is, ¹⁄₂₀ of that of the base 21. The top part 25a of the pin bracket 25 is flat, and the seat rail 7 shown in FIG. 12 is placed thereon. Both the parts are tightly fixed together with bolts, etc.

Lateral side plates 25b of the pin bracket 25 hang down from sides of the bracket 25, and end portions of the side plates 25b are bent inwardly. The side plates 25b are arranged inside the Z-arm side plates 23a with clearances. On the side plates 25b, pin holes 25c are formed. Into the pin holes 25c, the bracket pin 27 is inserted. The pin holes 25c is larger in size than the diameter of the bracket pin 27. Due to the clearance between them, errors in size of the seat and the vehicle body and accidental deformation are absorbed.

Between the respective lateral side plates 25b and the respective Z-arm side plates 23a, a spring plate 29 is sandwiched. The spring plate 29 has perforated spring-washer portions which are fitted into outsides of the bracket pin 27 with clearances. The spring plate 29 serves as a centering mechanism for urging the pin bracket 25 toward the center.

Such a centering mechanism allows the pin bracket 25 to be positioned in the vicinity of the center of the slidable range as much as possible. Due to the operation of the centering mechanism, the movable ranges of the slide mechanism and the rotational mechanism can be ensured in the both directions (right/left, up/down, and front/rear) after the seat-weight measuring apparatus is equipped.

Next, structures around the sensor plate 51 are described.

The sensor plate (spring member) 51 which is a base material of the load sensor 50 is provided with a strain gauge formed thereon with a bridge circuit having strain resistances 54a to 54d. The sensor plate 51, as shown in FIGS. 10 (A) and (B) and FIG. 11, is tightly fixed to a column 63 in the central portion of the base bottom plate 21c with a washer 67, a nut 68, and a bolt 69.

The half arms 41 and 42, as shown in FIGS. 10 and 11, are components of a group of four, front/rear and up/down, and are assembled so as to sandwich the sensor plate 51 from the front/rear and up/down directions and fixed to sensor plate 51 with bolts 43, etc.

Between both supporting points 41b and 42b of blades 41a and 42a extended from the upper/lower half arms 41 and 42, the application part 23j of the Z-arm 23 is sandwiched. In addition, the supporting points are positioned at just the midpoint (a constricted part 51c of the sensor plate 51) of two strain gauges 54a and 54c or 54d and 54b.

When a load is applied to the pin bracket 25 of the seat-weight measuring apparatus 9, the Z-arm 23 is slightly rotated so as to raise the application part 23j thereof upwardly. It is FIG. 11(C) to show a state of the sensor plate and the half arm at this time schematically and exaggeratedly.

When the Z-arm application part 23j is raised, the supporting point 41b of the upper half arm 41 is elevated. A moment M is applied to end portions in the back and forth direction of the sensor plate 51. Due to the moment M, the strain gauges 54a and 54b in the end portions in the back and forth direction are pulled while the strain gauges 54c and 54d in the central portion are compressed. Changes in resistance due to these actions of the respective strain gauges are converted to electrical signals so as to measure the strain of the sensor plate and the load applied to the pin bracket 25 by extension.

Next, the entire displacement/deflection absorbing mechanism of the seat-weight measuring apparatus will be described with reference to FIG. 10.

The pin bracket 25 is tightly fixed to the seat rail 7 with bolts, etc. In the vertical direction of the vehicle body, displacement is absorbed by the clearance between the pin hole 25c of the pin bracket 25 and the bracket pin 27.

In the back and forth direction of the vehicle body, the pin hole 25c of the pin bracket 25 is elongated so as to absorb the displacement.

In the right and left direction of the vehicle body, displacement is absorbed by the clearance between the pin bracket side plate 25b and the Z-arm side plate 23a. In addition, the centering mechanism by the spring plate 29 is provided in this part, as described above.

For the rotation about the vertical direction of the vehicle body as the axis, displacement is absorbed mainly by the clearance between the pin bracket side plate 25b and the Z-arm side plate 23a.

For the rotation about the back and forth direction of the vehicle body as the axis, displacement is absorbed mainly by the clearance between the pin bracket side plate 25b and the Z-arm side plate 23a, just like for about the vertical direction of the vehicle body.

For the rotation about the right and left direction of the vehicle body as the axis, displacement is absorbed mainly by the rotation of the pin bracket 25 about the bracket pin 27.

In the seat-weight measuring apparatus 9 as constructed above, in order to adjust errors in size of each part and prevent strain from being generated, the diameter of the pin hole 23c is slightly larger than that of a bracket pin to be inserted (stopper pin) 27. Therefore, the bracket pin 27 inserted into the pin hole 23c is not rigidly fixed relative to the Z-arm 23. Accordingly, the bracket pin 27 is rattling within the pin hole 23c, so that abnormal noise may be generated due to vibration by vehicle traveling, or the seat rail 7 supported by the bracket pin 27 via the pin bracket 25 may slightly vibrate. Thereby, an occupant sitting on the seat 3 may feel rattle.

The diameter of the pin hole 23e of the Z-arm side plate 23a is also slightly larger than that of the base pin 31 just like mentioned above, the base pin 31 is chattering within the pin hole 23e, so that abnormal noise may be generated due to vibration by vehicle traveling, and comfortableness in a cabin may be damaged.

SUMMARY OF THE INVENTION

The present invention has been made in view of these problems, and it is an object of the present invention to provide a rotational structure and a bearing structure wherein discomfort of people therearound can be eliminated by suppressing noise due to movement (rattle) of a member in a rotational supporting point within small clearance. Furthermore, it is another object to provide a seat-weight measuring apparatus having such a rotational structure and a bearing structure.

In order to solve the aforementioned problems, a rotational structure according to the present invention comprises a center-of-rotation pin, two members relatively rotatable about the pin and having insertion holes for the pin, an internal sleeve lying between the insertion hole of one member (a first member) and the external periphery of the pin while extending into the insertion hole of the other member (a second member), and an external sleeve lying between the external periphery of the internal sleeve and the insertion hole of the second member, wherein the internal sleeve, while being press-fitted into the insertion hole of the first member, has a pressing section which is elastically pressed onto the external periphery of the pin so as to slidably and elastically keep the pin in contact with the internal sleeve, and wherein the external sleeve, while being press-fitted into the insertion hole of the second member, has a pressing section which is elastically pressed onto the external periphery of the internal sleeve so as to slidably and elastically keep the internal sleeve in contact with the external sleeve.

According to a rotational structure of the present invention, the free clearance in the radial direction is forced out due to the pressing sections of the external and internal sleeves, so that pins and the external and internal sleeves cannot rattle within insertion holes. Therefore, abnormal noise produced following the chattering of members can be suppressed.

In addition, in the present invention, by contrast to the above description, the bore of the sleeve may be press-fitted so that the pressing section of the sleeve may be elastically urged in the external diameter side, and this case is also within the scope of the present invention.

In a rotational structure according to the present invention, the pressing section may be a tapered end portion of the sleeve.

In this case, the pressing section can be readily fabricated. Moreover, the tapered pressing section fits perfectly on the entire external periphery of the pin or the internal sleeve, the pressing can be performed with a uniform elastic force in the radial direction.

In a rotational structure according to the present invention, the sleeve may have a flange section which lies between side surfaces of the first and second members. In this case, the flange section of the sleeve serves as a plane bearing between the first and second members.

In a rotational structure according to the present invention, a surface of the sleeve may be coated with a material having a low coefficient of friction. In this case, there is an advantage that the sleeve slides more smoothly.

A bearing structure for use in an automobile cabin according to the present invention comprises a bearing member, a sleeve member fitted into an insertion hole of the bearing member, and a shaft member fitted into an insertion hole of the sleeve member, wherein the sleeve member is formed so that any of part of the insertion hole of the sleeve member always comes into contact with the shaft member so as not to allow the shaft member to run freely within the insertion hole of the sleeve member when the shaft member moves.

In the bearing structure according to the present invention, the sleeve member is formed so that any of part of the insertion hole of the sleeve member always comes into contact with the shaft member. Accordingly, the shaft member does not rattle within holes of the sleeve members even when the shaft member moves due to vibration during vehicle traveling, so that noise and vibration are transmitted to the arm member and the sleeve member from the contact portion so as to be damped. Therefore, abnormal noise generated in a cabin during vehicle traveling following the chattering of the shaft member can be suppressed, eliminating uncomfortable feeling of an occupant sitting on the seat.

The bearing structure according to the present invention may also be applied to a seat-weight measuring apparatus. That is, in an apparatus for measuring the seat weight including the weight of an occupant sitting on an automobile seat, the apparatus comprising a rail-like base frame fixed to a vehicle body or part of the seat, an arm member supported to the base frame rotatably in the vertical direction by a pivot member, a stopper pin attached to the arm member and being movably brought into engagement with an opening of the base frame so as to restrict the rotational range of the arm member, and a bracket pivotably attached to the arm member by the stopper ping so as to transmit the seat weight to the stopper pin, wherein the load applied to the stopper pin allows the arm member to rotate about the pivot member so as to produce displacement in a sensor, a bearing structure comprises sleeve members wherein the pivot member is inserted into the arm member via one of the sleeve members while the stopper pin is also inserted into the bracket via the other sleeve member, so that any of part of the insertion holes of the respective sleeve members always comes into contact with the pivot member and the stopper pin, so as not to allow the pivot member and the stopper pin to run freely within the insertion holes when the pivot member and the stopper pin move.

In the bearing structure according to the present invention, part or the entirety of the sleeve member may be tapered so that the sleeve member always comes into contact with the shaft member. Furthermore, part or the entire of the sleeve member may be slit in an axial direction.

Also, in order to cause any of part of the insertion hole of the sleeve member to always come into contact with the shaft member, part or the entirety of the sleeve member may be formed to be bellow-shaped, or part or the entire radial section of the sleeve member may be formed to be polygonal.

In the bearing structure according to the present invention, it is preferable to circumferentially cover a pipe on the shaft member so as to stick on the external surface of the shaft member. In this case, the sleeve member is circumferentially covered on the pipe. Thereby, the clearance between the shaft member and the sleeve member is further reduced, so that abnormal noise due to the rattle of the shaft member during vehicle traveling is further suppressed.

In the bearing structure according to the present invention, the sleeve member may have a double structure comprising an internal sleeve inserted into the insertion hole of the bearing member while being inserted to the shaft member from outside and an external sleeve inserted into the insertion hole of the bearing member while being inserted to the internal sleeve from outside.

A seat-weight measuring apparatus according to the present invention for measuring the seat-weight including the weight of an occupant sitting on a vehicle seat, the seat-weight measuring apparatus comprises a base frame extending in a longitudinal direction of a vehicle, rail brackets respectively arranged toward back and forth ends of the base frame and lying between the base frame and a seat rail which slides in the longitudinal direction of the vehicle, and a sensor section mounted on the base frame and comprising a strain sensor fixed to a central portion of the base frame in a longitudinal direction and arms respectively arranged at back and forth ends of the base frame and extending in the longitudinal direction, the arm having a pressing part for transmitting a force to the strain sensor at one end (a central end) and a connecting part to the rail bracket at the other end (one of the front end and the rear end), wherein the arm and the rail bracket are provided with insertion holes for center-of-rotation pins formed thereon, and the arm and the rail bracket are connected to each other so as to be relatively rotatable about the pin, wherein the seat-weight measuring apparatus further comprises an internal sleeve lying between the insertion hole of the arm and the external periphery of the pin while extending into the insertion hole of the rail bracket, and an external sleeve lying between the external periphery of the internal sleeve and the insertion hole of the rail bracket, and wherein the internal sleeve, while being press-fitted into the insertion hole of the arm, has a pressing section which is elastically pressed onto the external periphery of the pin so as to slidably and elastically keep the pin in contact with the internal sleeve, and wherein the external sleeve, while being press-fitted into the insertion hole of the rail bracket, has a pressing section which is elastically pressed onto the external periphery of the internal sleeve so as to slidably and elastically keep the internal sleeve in contact with the pin.

In addition, by contrast to the above description, the internal sleeve may arranged in the rail bracket side while the external sleeve in the arm side, and this case is also within the scope of the present invention.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 3 includes sectional views of the seat-weight measuring apparatus of FIG. 2: (a) is a sectional view at the line IIIa—IIIa of FIG. 2, and (b) is a sectional view at the line IIIb—IIIb of FIG. 2.

FIG. 9 includes drawings for illustrating a conventional example:

FIG. 11 includes drawings for illustrating a conventional example:

FIG. 12 includes drawings for illustrating a conventional example:

DETAILED DESCRIPTION

Preferred embodiments will be described below; however, the present invention is not limited to these.

Figure 1:
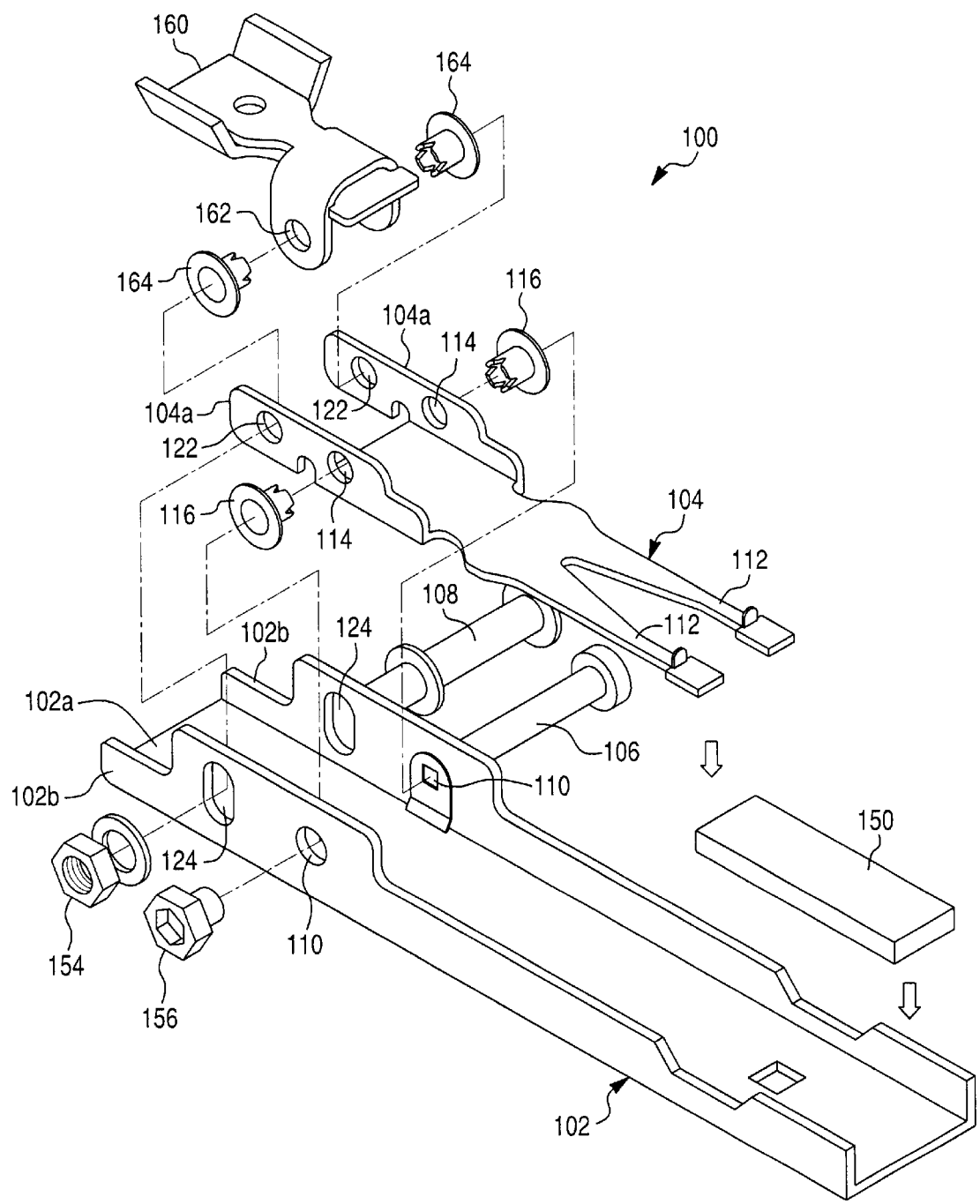
FIG. 1 is a disassembled perspective view of an essential part of a seat-weight measuring apparatus having a bearing structure according to the present invention applied thereto.
Figure 2:
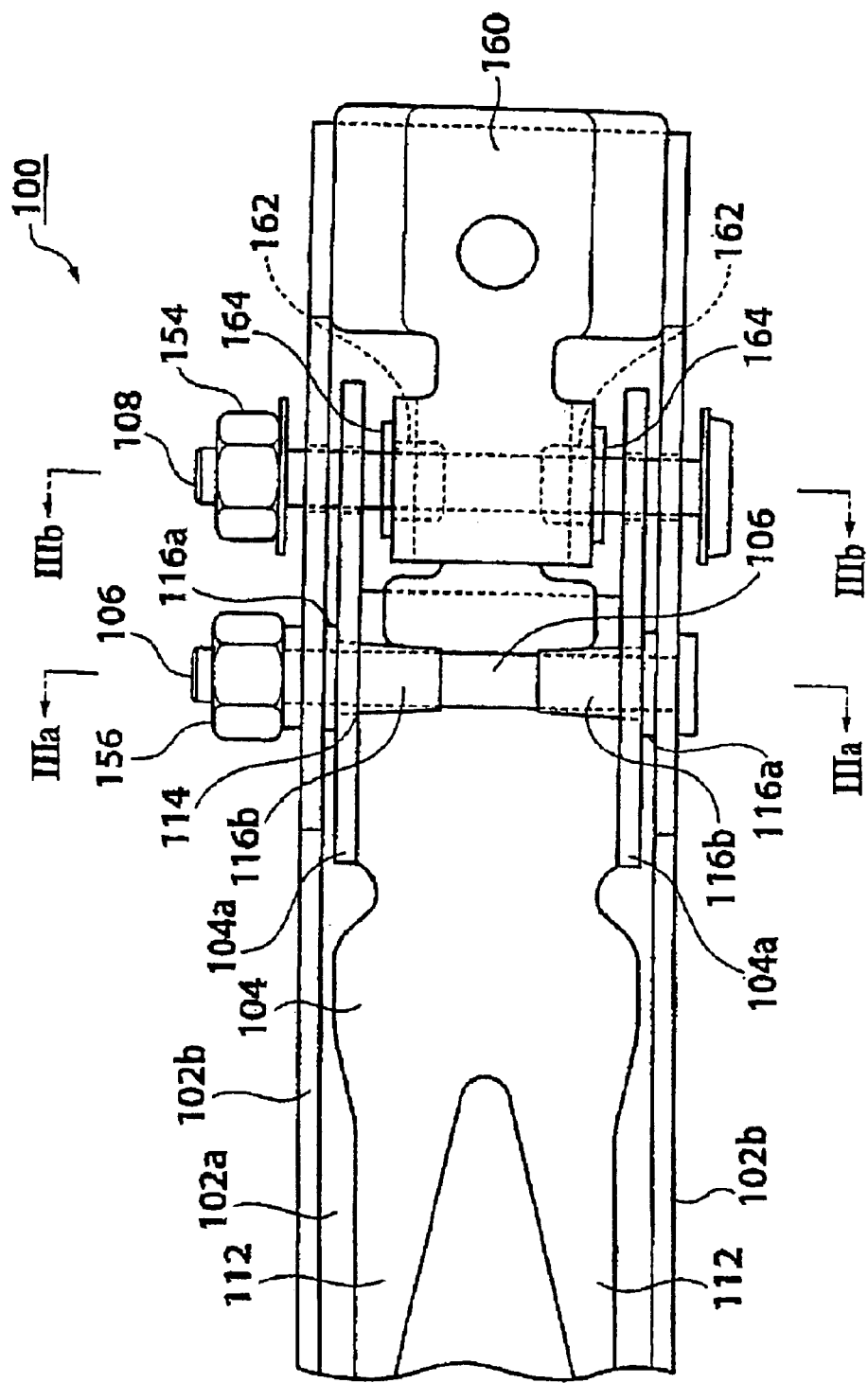
FIG. 2 is a plan view of the seat-weight measuring apparatus in one end side having a bearing structure according to the present invention applied thereto.

In FIGS. 1 to 3, a seat-weight measuring apparatus 100 has the following elements: a rail-like base frame 102 fixed to a vehicle body; an arm member (a bearing member) 104 vertically rotatably supported by a pivot pin (shaft member) 106 relative to the base frame 102; a stopper pin (shaft member) 108 for restricting the rotational range of the arm member 104; a bracket (bearing member) 160 pivotablly connected to the stopper pin 108 relative to the arm member 104; the bracket 160 transmits the weight of a seat including that of an occupant to the stopper pin 108; and sleeve members 116 and 164 interposed between the pivot pin 106 and the arm member 104, and between the stopper pin 108 and the bracket 160, respectively.

A sleeve member, which is a feature of the present invention, will be described below. The sleeve members 116 and 164 shown in FIGS. 1 to 3 use any one of sleeve members shown FIGS. 4 to 6. The sleeve members shown FIGS. 4 to 6 have a shape that any of part of an insertion hole of the sleeve member abuts a peripheral surface of the pin 106 or 108, even when the pivot pin 106 or the stopper pin 108, both of which are inserted into the sleeve members, is moved due to vibration by vehicle traveling.

Figure 4A:
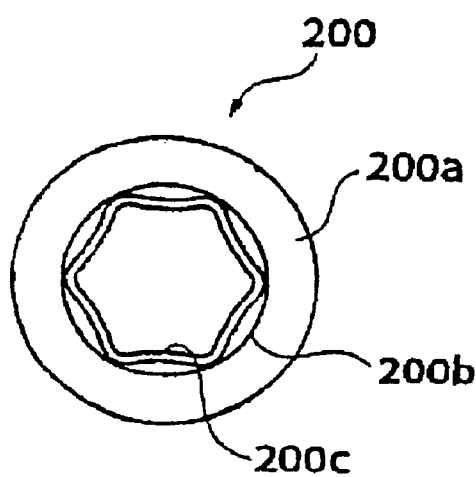
FIG. 4(a) is a front view a sleeve member used in a bearing structure according to the present invention.
Figure 4B:
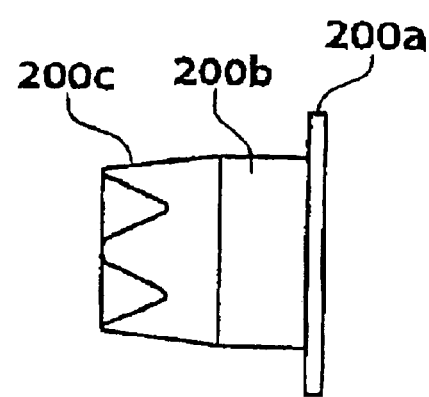
FIG. 4(b) is a side view of FIG. 4(a).
Figure 5A:
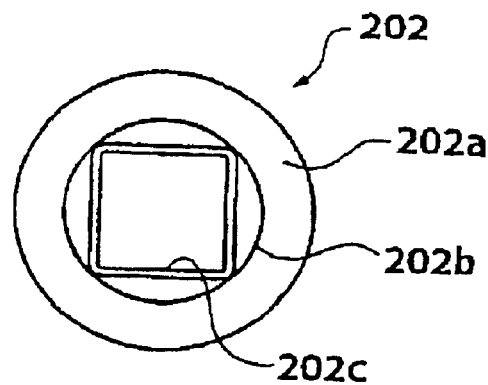
FIGS. 5(a) to (d) are front views of respective sleeve members used in the bearing structure according to the present invention.
Figure 5B:
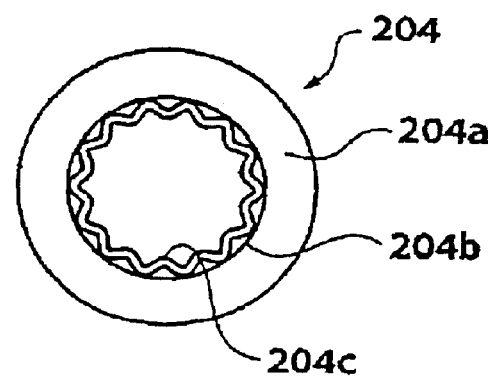
Figure 5C:
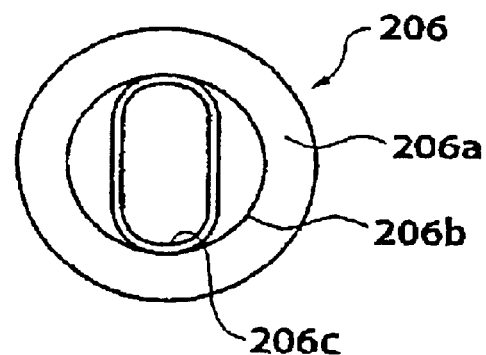
Figure 5D:
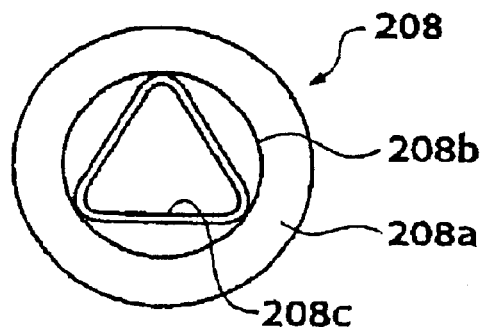

FIG. 4(a) is a front view of a sleeve member 200; and FIG. 4(b) is a side view thereof. In FIG. 4, in the sleeve member 200, a tubular section 200b is linked to the flange section 200a, and an end portion 200c of the tubular section 200b is formed. When the pivot pin 106 or the stopper pin 108 is inserted into the tubular section 200b, the end portion 200c comes into contact with a peripheral surface of the pin 106 or 108.

Next, modifications of the sleeve member will be described. Each of FIGS. 5(a) to (d) are front views of different sleeve members. In a sleeve member shown in FIG. 5(a), a tubular section 202b is linked to an annular flange section 202a, and an end portion 202c of the tubular section 202b is formed to be substantially square by drawing. In a sleeve member shown in FIG. 5(b), a tubular section 204b is linked to an annular flange section 204a, and an end portion 204c of the tubular section 204b is finely corrugated by drawing. In a sleeve member shown in FIG. 5(c), a tubular section 206b is linked to an annular flange section 206a, and an end portion 206c of the tubular section 206b is formed to be elliptic by drawing. In a sleeve member shown in FIG. 5(d), a tubular section 208b is linked to an annular flange section 208a, and an end portion 208c of the tubular section 208b is formed to be substantially triangular by drawing.

Figure 6A:
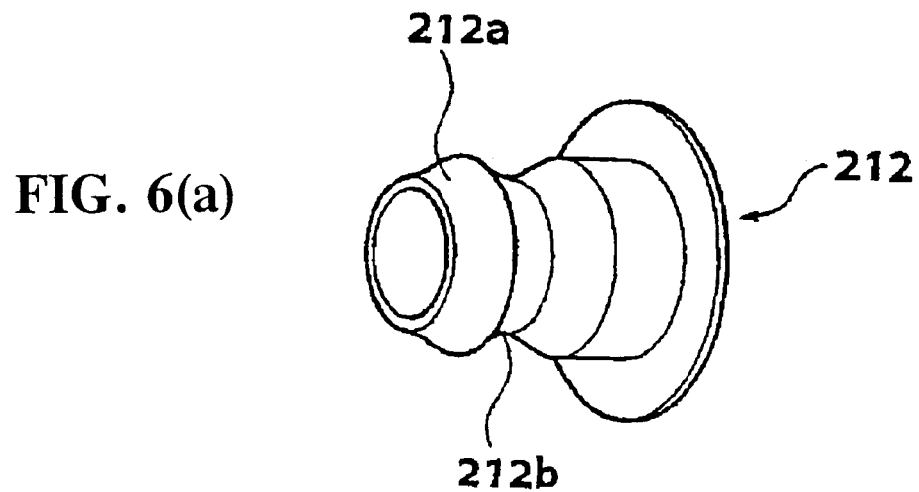
FIGS. 6(a) to (c) are perspective views of respective sleeve members used in the bearing structure according to the present invention.
Figure 6B:
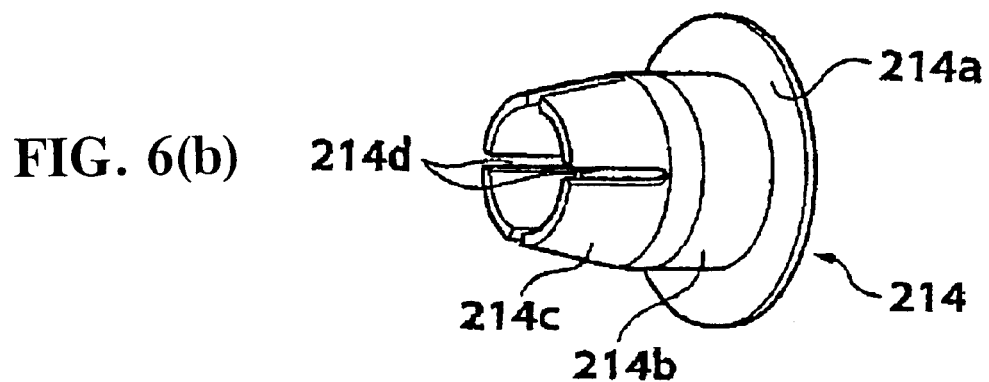
Figure 6C:
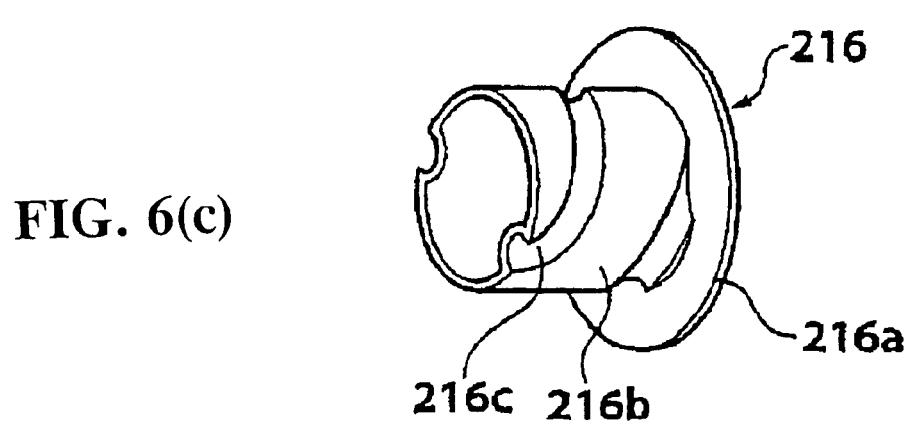

Each of FIGS. 6(a) to (c) are perspective views of different sleeve members. In a sleeve member shown in FIG. 6(a), a tubular section 212b is linked to an annular flange section 212a, and an intermediate portion 212c is constricted so as to form the tubular section 212b to be bellow-shaped, so that the intermediate portion 212c comes into contact with a peripheral surface of the pivot pin 106 or the stopper pin 108. In a sleeve member shown in FIG. 6(b), a tubular section 214b is linked to an annular flange section 214a, and an end portion 214c of the tubular section 214b is constricted while slits 214d are cut therein. In a sleeve member shown in FIG. 6(c), a tubular section 216b is linked to an annular flange section 216a, and spiral grooves 216c are formed on the tubular section 216b.

Next, the structure of the seat-weight measuring apparatus will be described. As shown in FIGS. 1 to 3, the base frame 102 of the seat-weight measuring apparatus has a substantially U-shape with a missing top surface in a direction perpendicular to a longitudinal direction (the longitudinal direction is referred to as a back-and-forth direction below). The base frame 102 comprises a bottom plate 102a and side plates 102b vertically elevated from the right and left both sides in the longitudinal direction of the bottom plate 102a. In each vicinity of both ends of the base frame 102 in the back-and-forth direction, a pair of pivot-pin insertion holes 110 are formed so as to penetrate the side plates 102b coaxially in the direction perpendicular to the longitudinal direction.

The arm member 104 is an elongated plate-like member having the substantially half of the length of the base frame 102 in the longitudinal direction, and one arm member 104 is arranged in one half section of the base frame 102 in the longitudinal direction while the other one arm member 104 in the other half section. One half section of the arm member 104 is an application part 112 forked laterally, which applies a load on a sensor plate 150 by vertical movement of the end portion thereof in accordance with the rotation of the arm member 104 about the pivot pin 106, as will be described later. Each one of the arm members 104 extends between the right and left side plates 102b toward the central portion of the base frame 102 in the longitudinal direction so that the application part 112 faces that of the other arm member 104.

In the other half section of the arm member 104, a pair of side plates 104a are elevated along the right and left sides of the arm member 104 in the longitudinal direction. On the side plates 104a, pivot insertion holes 114 are formed so as to overlap coaxially with the insertion holes 110 formed on both the right and left side plates 102b. Into the pivot insertion holes 114, the respective sleeve members 116 are inserted. The arm member 104 is held to the base frame 102 by the pivot pin 106 which is inserted into and penetrates the insertion holes 114, into which the sleeve members 116 are inserted, and the insertion holes 110 of the base frame 102, and moreover, the arm member 104 is rotatable vertically about the pivot pin 106. Both ends of the pivot pin 106 extend outside the right and left sides of the base frame 102, and the pivot pin 106 is fixed not to come out with a nut 156 screwed on one end.

Since this sleeve member 116 uses any one of the aforementioned members shown in FIGS. 4 to 6, even when the pivot pin 106 is moved due to vehicle vibration, etc., the contact between the tubular section of the sleeve member 116 and the peripheral surface of the pivot pin 106 is always maintained. Thereby, the bracket 160 can be held without rattling while abnormal noise can be suppressed.

On the side plates 104a of the arm member 104, stopper-pin insertion holes 122 are formed in the vicinity of an end portion separating from the application part 112 across the pivot pin insertion holes 114. The stopper-pin insertion holes 122 are formed so as to penetrate the right and left side plates 104a coaxially in the direction perpendicular to the longitudinal direction. The stopper pin 108 is inserted into the insertion holes 122 and assembled into the arm member 104 while extending in parallel with the pivot pin 106 (see FIG. 2). Both ends of the stopper pin 108 inserted into the insertion holes 122 are inserted into respective guide holes 124 which are formed on the both side plates 102b of the base frame 102 and elongated in the vertical direction. The stopper pin 108 is movable in the vertical direction within the guide holes 124. Both ends of the stopper pin 108 extend outside the sides of the base frame 102 via the guide holes 124, and the stopper pin 108 is fixed not to come out with a nut 154 screwed on one end.

Figure 7A:
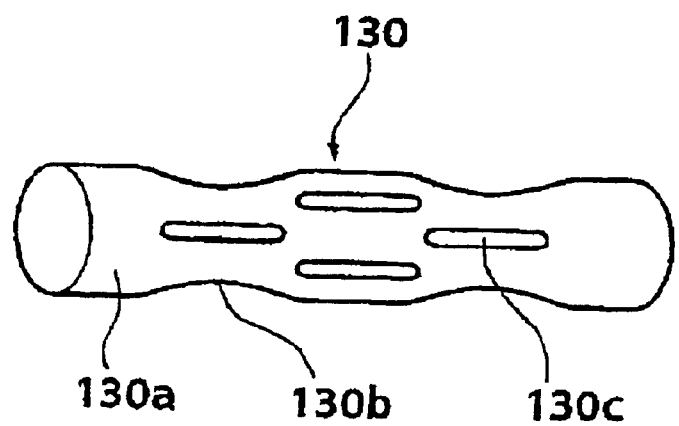
FIG. 7(a) is a perspective view of a pipe circumferentially covered on a shaft member in the bearing structure according to the present invention.

Referring now to FIG. 7, a pipe to be inserted into a shaft of the stopper pin 108 will be described. Although omitted in FIGS. 1 and 2, it is preferable that the shaft of the stopper pin 108 be provided with a pipe shown in FIG. 3 as numeral 130 circumferentially covered thereon. FIG. 7(a) is a perspective view of an example of such a pipe.

In the pipe 130, intermediate portions are constricted to form small-diameter portions 130b, and slits 130c are opened so as to extend in the axial direction. When the stopper pin 108 is inserted into the pipe 130, the small-diameter portions 130b stick to the shaft of the stopper pin 108. When inserting the stopper pin 108 into the pipe 130, the pipe 130 deforms appropriately at portions of the slits 130c, enabling the stopper pin 108 to be easily inserted. By circumferentially covering the stopper pin 108 with such a pipe 130, clearances between the stopper pin 108, the sleeve members 164, and the arm member 104 are further reduced, so that abnormal noise due to the rattle of the stopper pin 108 during vehicle traveling is further suppressed.

Figure 7B:
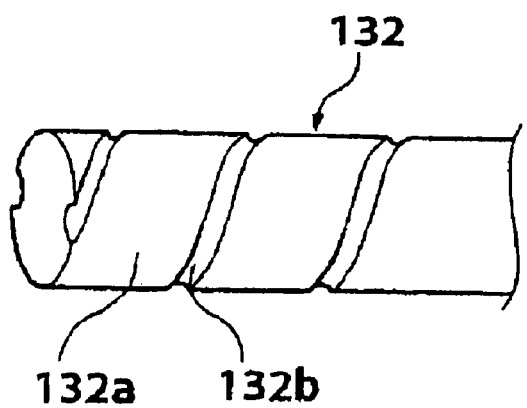
FIGS. 7(b) and 7(c) show perspective views of alternative pipes for circumferentially covering a stopper pin.

FIGS. 7(b) and (c) are drawings showing other examples of pipes for circumferentially covering the stopper pin 108. In a pipe 132 shown in FIG. 7(b), spiral concave grooves 132b are formed on a peripheral surface 132a so as to stick on the peripheral surface of the stopper pin 108.

Figure 7C:
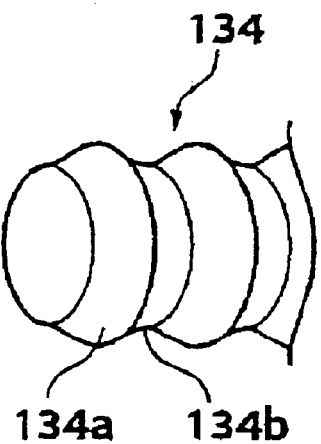

A pipe 134 shown in FIG. 7(c) is a bellow-type pipe having small-diameter portions 134b constricted in the radial direction at predetermined intervals. In the pipe 134, the small-diameter portions 134b come into contact with the peripheral surface of the stopper pin 108. In addition, each pipe shown in FIGS. 7(a) to (c) can be used for the pivot pin 106 just like for the stopper pin 108.

The structure of the seat-weight measuring apparatus will be described in succession. As is most clearly shown in FIG. 1, the guide hole 124 formed in the base frame 102 is an elongated hole having a predetermined length in the vertical direction and has a width sufficiently larger than the diameter of the stopper pin 108. Both ends of the stopper pin 108 are inserted into the guide holes 124. The both ends of the stopper pin 108 are movable in the vertical direction by the length of the guide hole 124 in the vertical direction. In addition, when the arm member 104 is rotated about the pivot pin 106, the arm member 104 vertically moves integrally with the stopper pin 108; at this time, the rotational range of the arm member 104 is restricted by the stopper pin 108 which is limited in the vertical-movement stroke by the guide holes 124.

To the stopper pin 108, the bracket 160 is attached. The bracket 160 is connected to a seat rail (not shown in FIGS. 1 to 3) which is extendedly arranged under each of the right and left side faces of a seat (not shown in FIGS. 1 to 3) via a bolt and nut or a rivet. The bracket 160 connects the seat rail to the seat-weight measuring apparatus 100 while transmitting the seat weight including the weight of a person sitting thereon to the stopper pin 108.

In the bracket 160, the stopper-pin insertion holes 162 are formed. Into the stopper-pin insertion holes 162, the sleeve members 164 are inserted, so that the bracket 160 is held to the stopper pin 108 rotatably about the axis of the stopper pin 108. The sleeve member 164 uses any one of aforementioned members shown in FIGS. 4 to 6. Therefore, just like mentioned above, even when the stopper pin 108 is moved due to vehicle vibration, etc., the contact between the tubular section of the sleeve member 116 and the peripheral surface of the stopper pin 108 is always maintained, so that the bracket 160 can be held without rattling while abnormal noise can be suppressed.

In addition, other structures of the seat-weight measuring apparatus 100 may be the same as those of the seat-weight measuring apparatus 9 disclosed in the aforementioned Japanese Unexamined Patent Application Publication No. 2000-258233. That is, although not shown in FIGS. 1 to 3, in the central portion of the base frame 102 in the longitudinal direction, a load sensor having a sensor plate just like the aforementioned sensor 50 is arranged, and to the sensor plate, ends of the application part 112 of the arm member 104 is connected via half arms. The sensor plate is fixed to a column elevated from the central portion of the base frame 102 with bolts and nuts. When a load is applied to the stopper pin 108 in the vertical direction, each of the arm members 104 is rotated about the pivot pin 106 so that the ends of the application part 112 are moved in the vertical direction. At this time, in the sensor plate connected to the ends of the application part 112, strain is generated, and the sensor detects the load applied to the stopper pin 108 based on the strain.

Figure 12A:
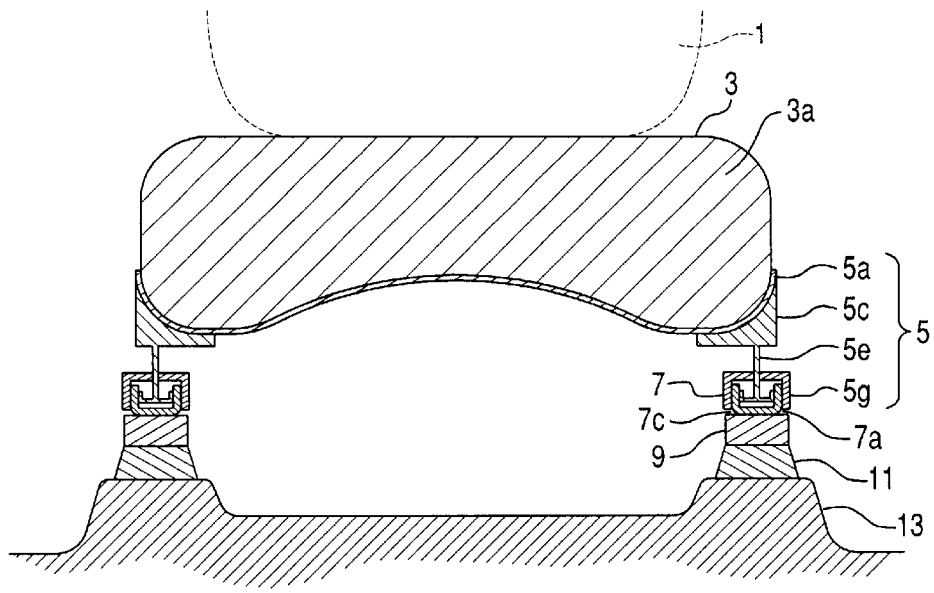
FIG. 12(A) is a front sectional view schematically showing a structure of a part in that a seat is attached to a vehicle body.
Figure 12B:
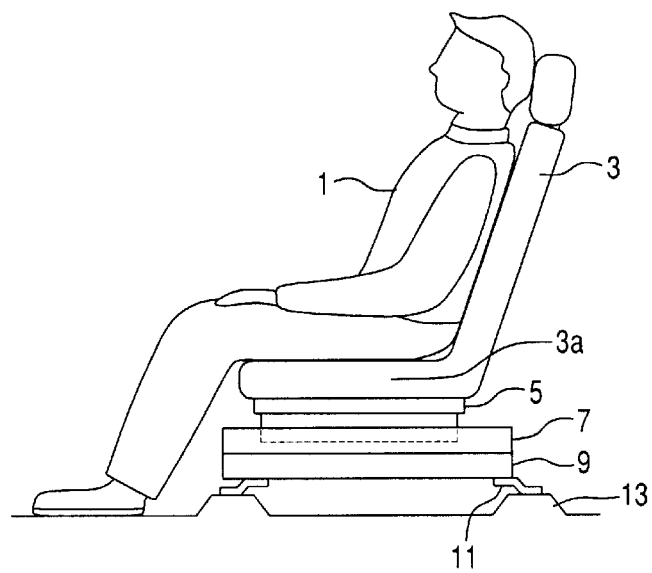
FIG. 12(B) is a side view.

The seat-weight measuring apparatus 100, just like the seat-weight measuring apparatus 9, is arranged so as to support a pair of seat rails which are extendedly arranged under the right and left side-faces of a vehicle seat from the under side, and is fixed to a vehicle body floor via a seat bracket (not shown) disposed under the base frame 102 (see FIG. 12). The seat rails and the seat-weight measuring apparatus 100 are connected to each other via the bracket 160 as described above. Thereby, the weight of a seat and an occupant sitting on the seat is applied to the stopper pin 108 via the bracket 160, so that the load sensor detects the weight by the aforementioned mechanism.

Figure 8A:
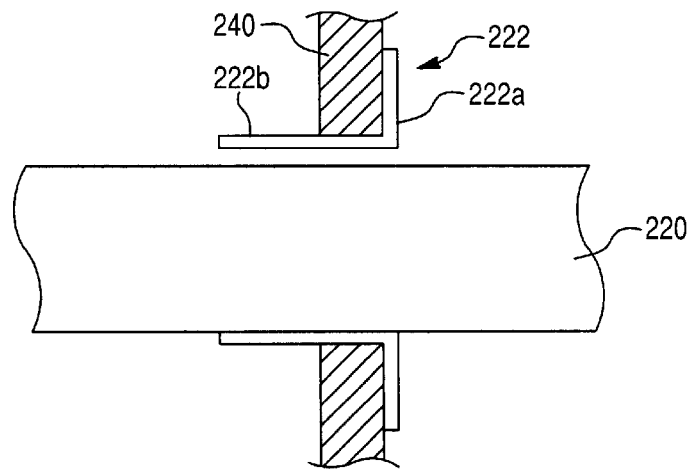
FIG. 8(a) is a schematic illustration for showing operation of a conventional bearing structure.

Next, the operation of a bearing structure according to the present invention will be described with reference to FIGS. 8(a) to (c). FIG. 8(a) is a schematic view for exaggeratedly showing the operation of a conventional bearing structure. In a sleeve member 222, a tubular section 222b is conventionally formed to have the same diameter in the axial direction. When such a sleeve member 222 is inserted into an insertion hole of a bearing member 240 and then, a shaft member 220 such as a pivot pin is inserted into the sleeve member 222 so as to form a bearing structure, the structure may be assembled in a state that a part of the shaft member 220 is separated from the internal surface of the sleeve member 222 due to dimensional difference in design.

In such a bearing structure, when a vehicle is traveling or an occupant on a seat moves, the shaft member 220 may be rattling (dancing) within the hole of the sleeve member 222. At this time, the shaft member 220 is brought into contact with an internal surface of the hole in the sleeve member 222, thereby generating abnormal noise (contact noise between metals).

Figure 8B:
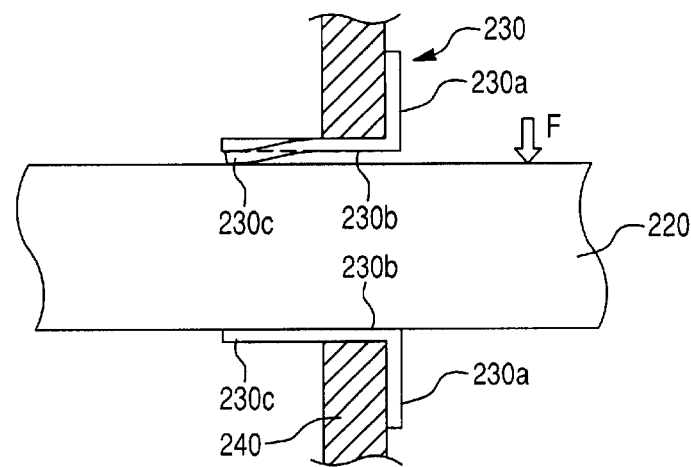
FIGS. 8(b) and 8(c) are schematic illustrations for showing operation of the bearing structure according to the present invention.
Figure 8C:
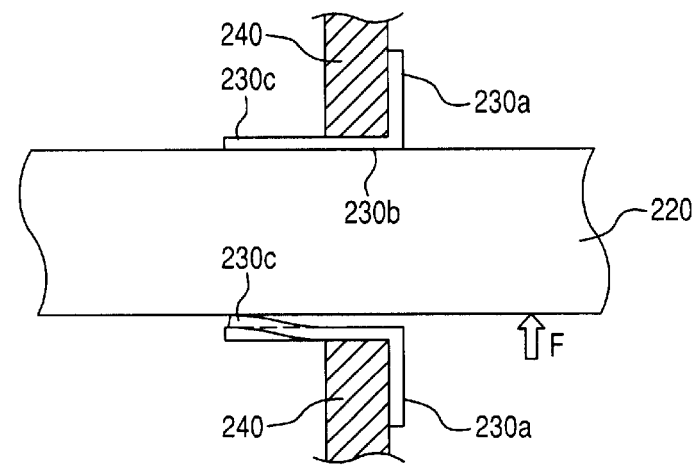
Figure 9A:
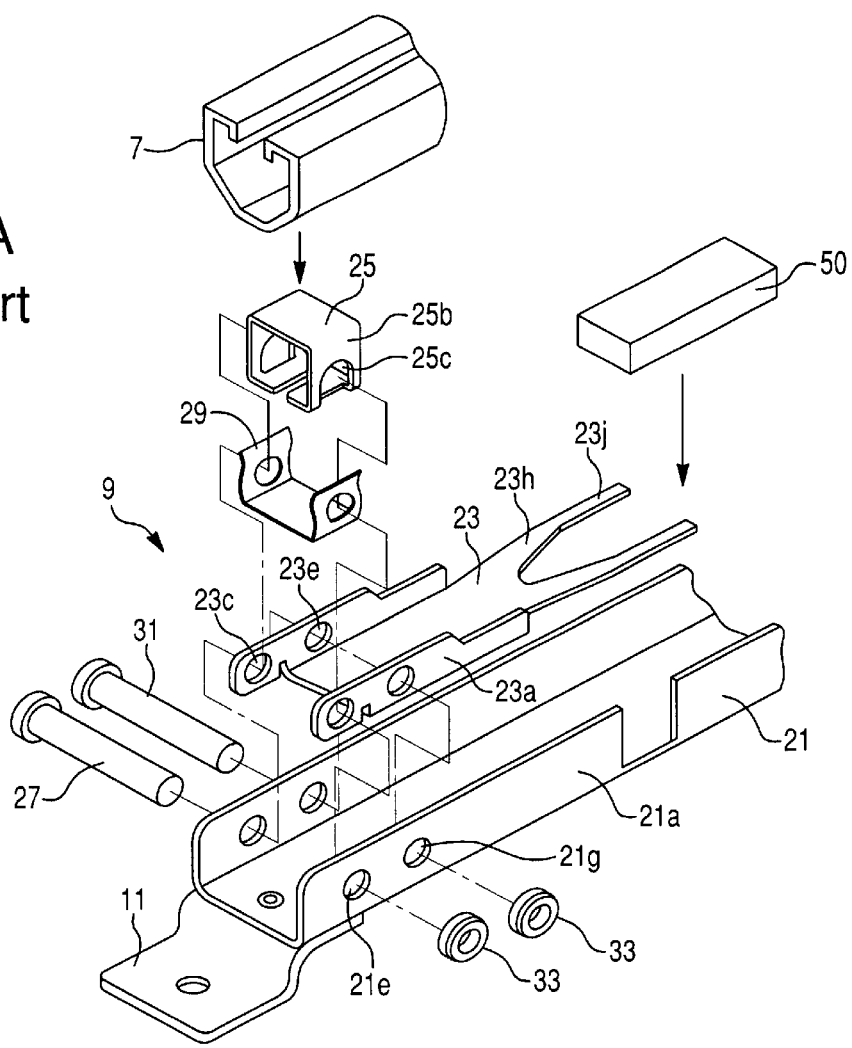
FIG. 9(A) is a disassembled perspective view of a displacement/deflection absorbing mechanism of a seat-weight measuring apparatus.
Figure 9B:
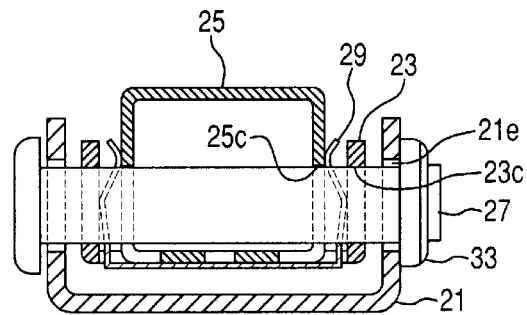
FIG. 9(B) is a front sectional view of a pin bracket.
Figure 10A:
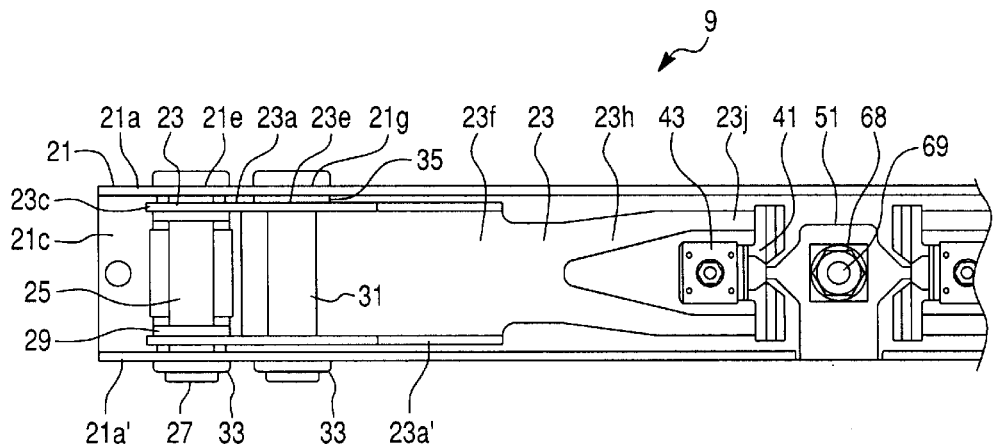
FIG. 10(A) is a plan view showing the entire structure of the seat-weight measuring apparatus.
Figure 10B:
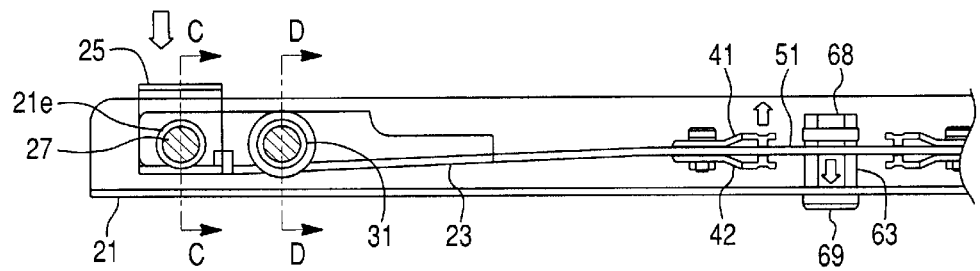
FIG. 10(B) is a side sectional view, and FIGS. 10(C) and (D) are front sectional views.
Figure 10C:
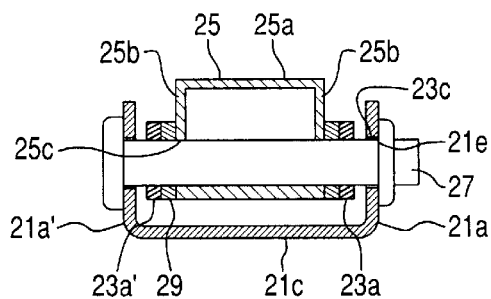
FIG. 10 includes drawings for illustrating a conventional example.
Figure 10D:
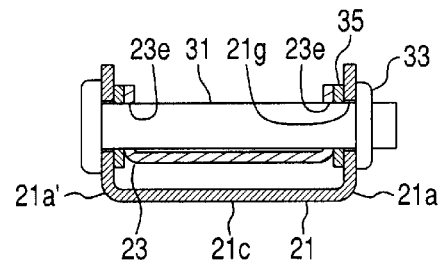
Figure 11A:
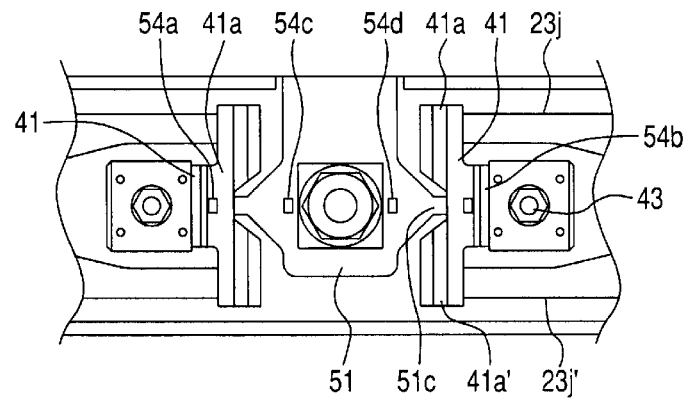
FIG. 11(A) is a plan view showing the relationship between a sensor plate and a half arm.
Figure 11B:
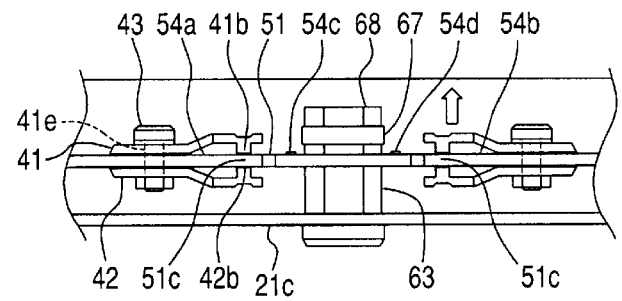
FIG. 11(B) is a side view in a no-load state.
Figure 11C:
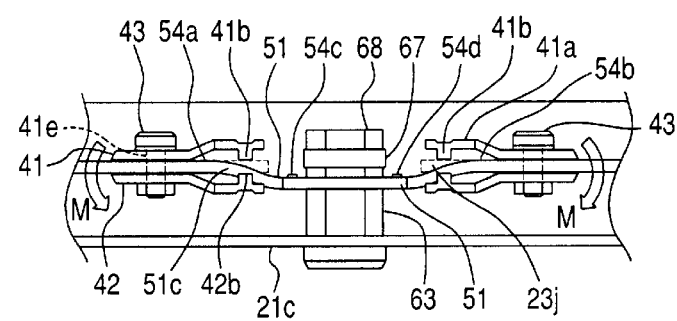
FIG. 11(C) is a side view schematically showing a state in that a load is applied.

In contrast, as shown in FIGS. 8(b) and (c), such abnormal noise cannot be generated in a bearing structure according to the present invention. FIGS. 8(b) and (c) are schematic views for exaggeratedly showing the operation of the bearing structure according to the present invention. In a sleeve member 230 in the drawing, just like the sleeve member shown in FIG. 4, the end 230c of a tubular section 230b is constricted. The sleeve member 230 is inserted into an insertion hole of the bearing member 240, and the shaft member 220 (a pivot pin 106 and a stopper pin 108) is inserted into the sleeve member 230.

In the bearing structure according to the present invention, when the vibration due to vehicle traveling is transmitted thereto, even when the shaft member 220 moves in the direction of arrows F in FIGS. 8(b) and (c), the end 230c of the sleeve member 230 always comes into contact with the peripheral surface of the shaft member 220 by following the movement of the shaft member 220. Accordingly, the shaft member 220 does not rattle within holes of the sleeve members 116 and 164, so that even when the shaft member 220 is rattling due to vibration, the abnormal noise and vibration are transmitted to the bearing members such as the arm member 104 and the bracket 160 via the sleeve members 116 and 164 so as to be damped. Therefore, abnormal noise generated in a cabin during vehicle traveling due to the rattle of the shaft member 220 can be suppressed, eliminating uncomfortable feeling of an occupant sitting on the seat.

Figure 13:
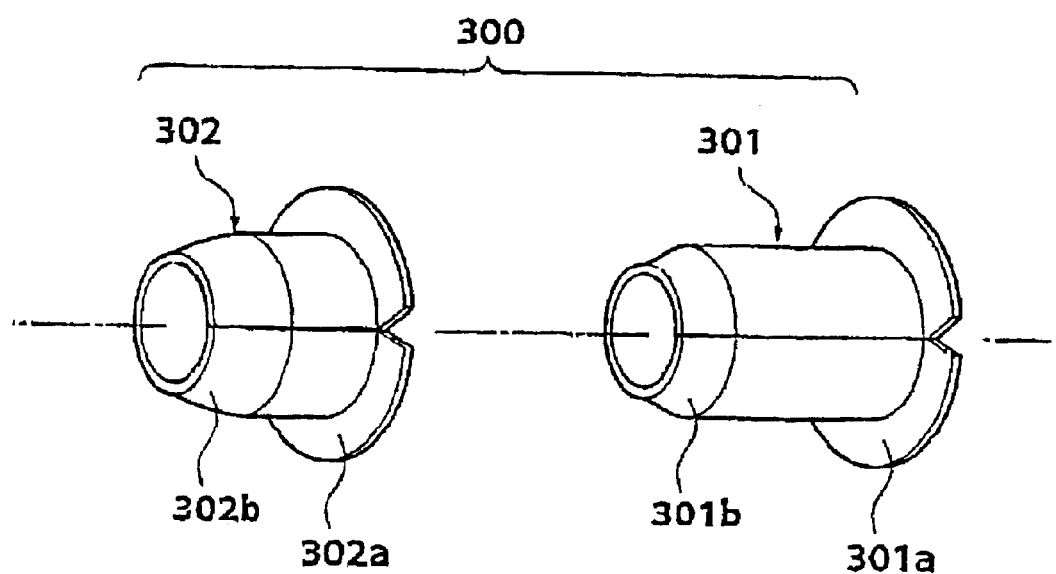
FIG. 13 is a perspective view of a double sleeve according to the present invention.
Figure 14:
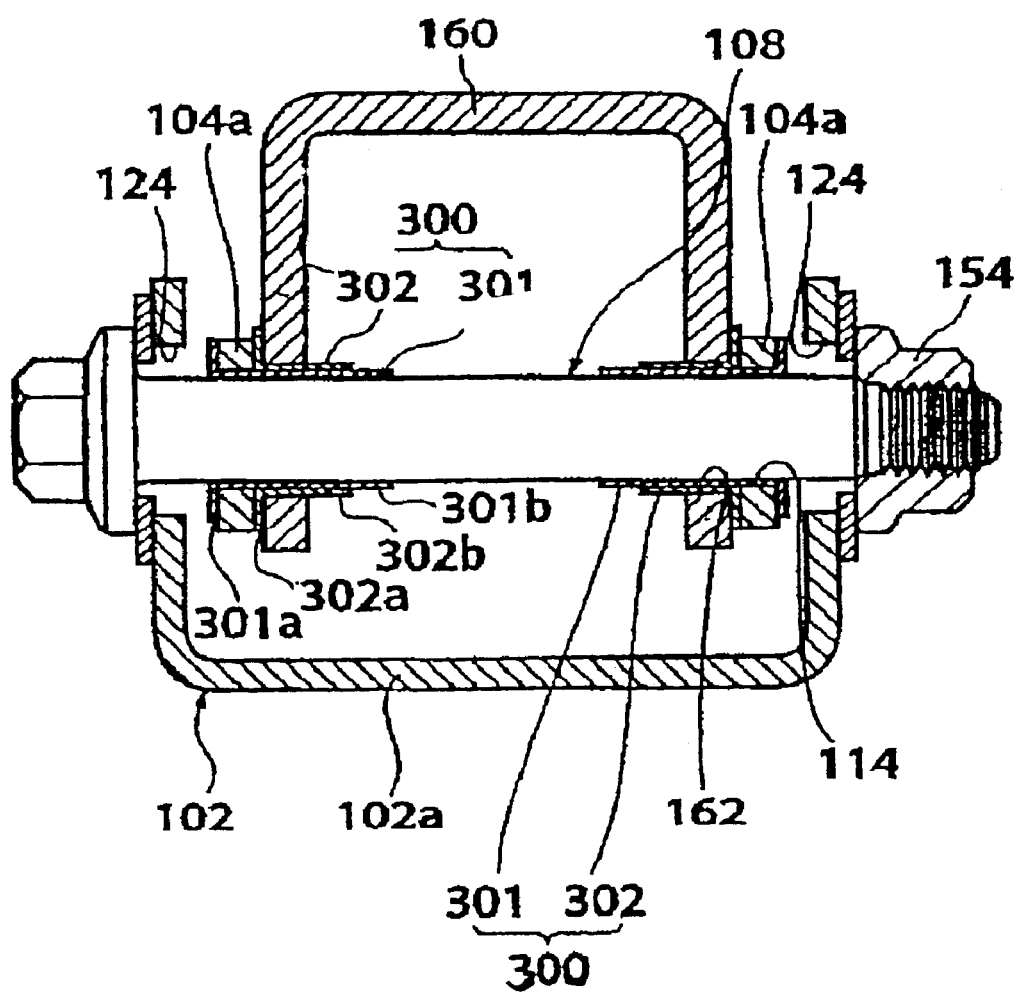
FIG. 14 is an enlarged front sectional view of a stopper pin along an axis of a seat-weight measuring apparatus having the double sleeve.
Figure 15:
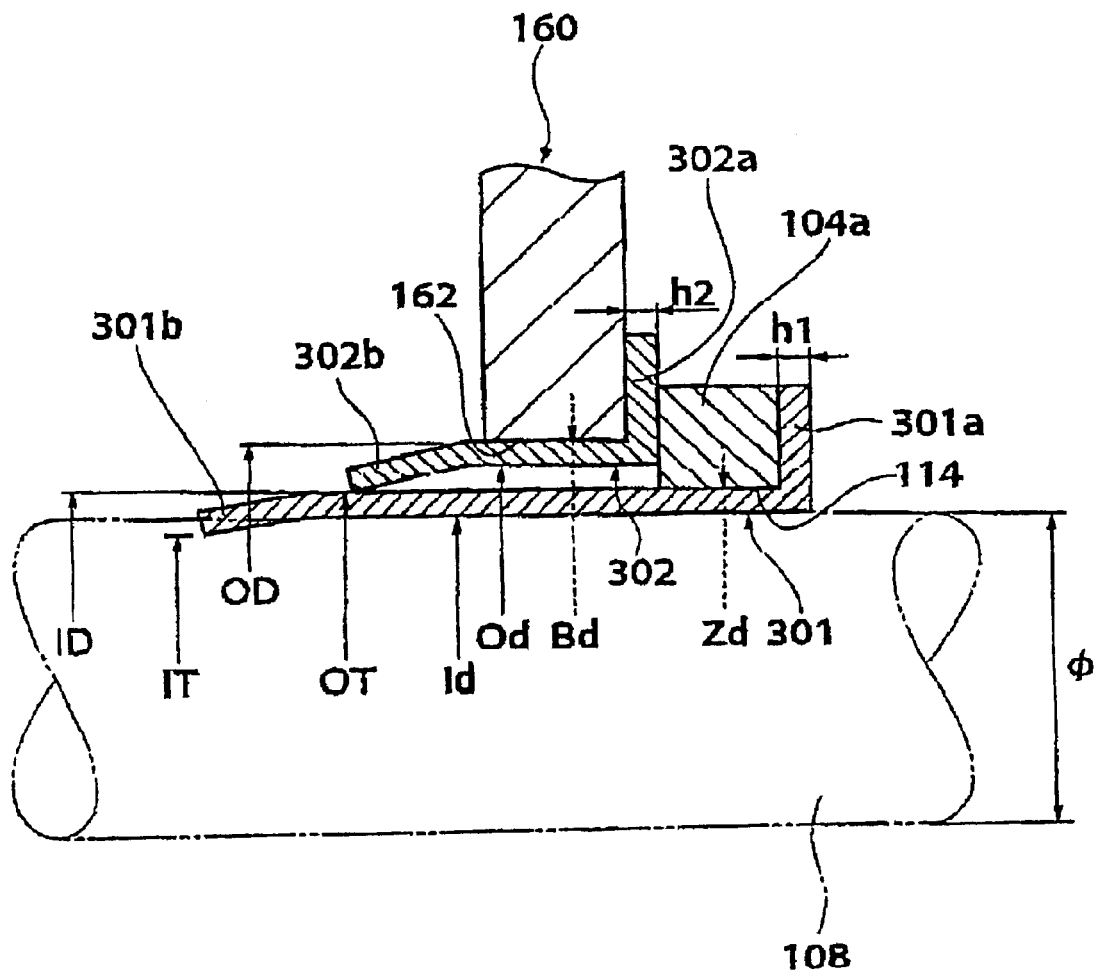
FIG. 15 is an enlarged sectional view for schematically and exaggeratedly showing the vicinity of the double sleeve.

Next, referring to FIGS. 13 to 15, a rotational structure (double sleeve example) according to the present invention will be described. FIG. 13 is a perspective view of a double sleeve example according to the present invention. FIG. 14 is an enlarged front sectional view along a stopper pin axis for showing a seat-weight measuring apparatus having the double sleeve. FIG. 15 is an enlarged sectional view for exaggeratedly and schematically showing the vicinity of the double sleeve.

As shown in FIG. 14, double sleeves 300 fit a peripheral surface of a tubular section of a stopper pin 108 from outside. The double sleeve 300, as plainly shown in FIG. 13, comprises a long internal sleeve 301 and a short external sleeve 302 fitting the internal sleeve 301 from outside. The sleeves 301 and 302 are drawing products from steel plates and have flange sections 301a and 302a at each one of ends and tapered draw sections (pressing sections) 301b and 302b at the other ends. Internal surfaces of the sleeves 301 and 302 and end-faces of the flange sections 301a and 302a are coated with a material with a low coefficient of friction such as Teflon. Due to the Teflon coating, the members can be smoothly slid therebetween. In addition, in FIGS. 13 and 15, inclinations of the draw sections 301b and 302b are exaggeratedly illustrated.

As shown in FIG. 14, the internal sleeve 301 of the double sleeve 300 is fitted between the shaft of the stopper pin (center-of-rotation pin) 108, the hole 114 of the arm (first member) side-plate 104a, and the hole 162 of the bracket (second member) 160. The external sleeve 302 is pressed within the hole 162 of the bracket 160. The flange section 302a of the external sleeve 302 lies between the arm side-plate 104a and the bracket 160. The flange section 302a serves as a plane bearing between the arm side-plate 104a and the bracket 160. The flange section 301a of the internal sleeve 301 lies along the outside of the arm side-plate 104a.

The relationship between the double sleeve 300 and peripheral members and operation thereof will be described. First, the external periphery of the internal sleeve 301 is pressed into the hole 114 of the arm side-plate 104a, so that the internal sleeve 301 cannot rattle within the hole 114. Since as for between the internal sleeve 301 and the stopper pin 108 fitting the internal hole of the internal sleeve 301, although there are clearances between the stopper pin 108 and the internal sleeve 301 other than the draw section 301b, the draw section 301b of the internal sleeve 301 abuts and holds the external peripheral surface of the stopper pin 108 elastically, the stopper pin 108 cannot rattle within the internal hole of the internal sleeve 301. The tapered draw section 301b comes into contact with the entire external periphery of the stopper pin 108 with an appropriate elastic force in the radial direction.

Next, as for the external sleeve 302, between the external sleeve 302 and the internal sleeve 301 fitting the internal hole of the external sleeve 302, the draw section 302b of the external sleeve 302 abuts and holds the external peripheral surface of the internal sleeve 301 elastically. Therefore, although there are clearances between the internal sleeve 301 and the external sleeve 302 other than the draw section 302b, the internal sleeve 301 cannot rattle within the internal hole of the external sleeve 302. The tapered draw section 302b comes into contact with the entire external periphery of the internal sleeve 301 with an appropriate elastic force in the radial direction. Furthermore, the external periphery of the external sleeve 302 is pressed into the hole 162 of the bracket 160, so that the external sleeve cannot rattle within the hole 162.

Accordingly, there is no clearance between the arm side-plate 104a of the bracket 160 and the stopper pin 108, in which each member rattles, when the weight applied to the seat is changed, noise generated by the rattling of the members (i.e., noise generated by contact between metals) can be suppressed.

As described above in detail, in the rotational structure according to the present invention, the free clearance in the radial direction is forced out due to the pressing parts of the external and internal sleeves, so that pins and the external and internal sleeves cannot rattle within insertion holes. Therefore, abnormal noise produced following the chattering of members can be suppressed.

Since the bearing structure according to the present invention uses the sleeve member formed so that any of part of the insertion hole of the sleeve member always comes into contact with the shaft member, the shaft member does not run freely within the insertion hole of the sleeve member and vibration and noise are transmitted to the arm member and the sleeve member from the contact portion so as to be damped. Also, noise generated by the contact between members (contact noise between metals) can be suppressed, thereby eliminating uncomfortable feeling of an occupant sitting on the seat.

The priority applications, Japanese Patent Application Nos. 2001-011865 and 2001-379905 filed on Jan. 19, 2001 and Dec. 13, 2001, respectively, are hereby incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A rotational structure comprising:
   a pin;
   first and second members relatively rotatable about the pin and having insertion holes for the pin;
   an internal sleeve lying between the insertion hole of the first member and the external periphery of the pin while extending into the insertion hole of the second member; and
   an external sleeve lying between the external periphery of the internal sleeve and the insertion hole of the second member,
   wherein the internal sleeve, while being press-fitted into the insertion hole of the first member, has a first pressing section which is elastically pressed onto the external periphery of the pin so as to slidably and elastically keep the pin in contact with the internal sleeve, and
   wherein the external sleeve, while being press-fitted into the insertion hole of the second member, has a second pressing section which is elastically pressed onto the external periphery of the internal sleeve so as to slidably and elastically keep the internal sleeve in contact with the external sleeve.

2. The rotational structure of claim 1, wherein the first pressing section comprises a tapered end portion of the internal sleeve.

3. The rotational structure of claim 1, wherein the second pressing section comprises a tapered end portion of the external sleeve.

4. The rotational structure according to claim 1, wherein the external sleeve has a flange section which lies between side surfaces of the first and second members.

5. The rotational structure of claim 1, wherein a surface of the internal sleeve is coated with a material having a low coefficient of friction.

6. The rotational structure of claim 1, wherein a surface of the external sleeve is coated with a material having a low coefficient of friction.

7. A bearing structure for use in an automobile cabin comprising:
   a bearing member;
   a sleeve member fitted into an insertion hole of the bearing member; and
   a shaft member fitted into an insertion hole of the sleeve member,
   wherein the sleeve member is formed so that a part of the insertion hole of the sleeve member is always in contact with the shaft member so that the shaft member cannot move freely within the insertion hole of the sleeve member when the shaft member moves,
   wherein the sleeve member has a double structure comprising:
      an external sleeve having an insertion hole, the external sleeve inserted into the insertion hole of the bearing member; and
      an internal sleeve having an insertion hole, the internal sleeve inserted into the insertion hole of the external sleeve; and
   wherein the shaft member is inserted in the insertion hole of the internal sleeve, and
   wherein the external sleeve is elastically pressed onto the external periphery of the internal sleeve so as to slidably and elastically keep the internal sleeve in contact with the external sleeve.

8. The bearing structure of claim 7, wherein the sleeve member is tapered so that the sleeve member always comes into contact with the shaft member.

9. A seat-weight measuring apparatus for measuring the seat-weight including the weight of an occupant sitting on a vehicle seat, the seat-weight measuring apparatus comprising:
   a base frame extending in a longitudinal direction of a vehicle;
   rail brackets respectively arranged toward back and forth ends of the base frame and lying between the base frame and a seat rail which slides in the longitudinal direction of the vehicle; and
   a sensor section mounted on the base frame and comprising:
      a strain sensor fixed to a central portion of the base frame in a longitudinal direction; and
      arms respectively arranged at back and forth ends of the base frame and extending in the longitudinal direction, each arm having a pressing part for transmitting a force to the strain sensor at one end and a connecting part to the rail bracket at the other end,
   wherein the arm and the rail bracket are provided with insertion holes for pins formed thereon, wherein the arm and the rail bracket are connected to each other so as to be relatively rotatable about the pin,
   wherein the seat-Weight measuring apparatus further comprises:
      an internal sleeve lying between the insertion hole of the arm and the external periphery of the pin while extending into the insertion hole of the rail bracket; and
      an external sleeve lying between the external periphery of the internal sleeve and the insertion hole of the rail bracket, and
   wherein the internal sleeve, while being press-fitted into the insertion hole of the arm, has a pressing section which is elastically pressed onto the external periphery of the pin so as to slidably and elastically keep the pin in contact with the internal sleeve, and
   wherein the external sleeve, while being press-fitted into the insertion hole of the rail bracket, has a pressing section which is elastically pressed onto the external periphery of the internal sleeve so as to slidably and elastically keep the internal sleeve in contact with the pin.

* * * * *